(12) United States Patent
Mossoba et al.

(10) Patent No.: US 12,026,749 B2
(45) Date of Patent: Jul. 2, 2024

(54) CONTENT OPTIMIZATION ON A SOCIAL MEDIA PLATFORM BASED ON THIRD-PARTY DATA

(71) Applicant: Capital One Services, LLC, McLean, VA (US)

(72) Inventors: Michael Mossoba, Arlington, VA (US); Mykhaylo Bulgakov, Arlington, VA (US); Abdelkader Benkreira, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/170,218

(22) Filed: Feb. 8, 2021

(65) Prior Publication Data
US 2021/0209651 A1 Jul. 8, 2021

Related U.S. Application Data

(63) Continuation of application No. 16/734,581, filed on Jan. 6, 2020, now abandoned.

(51) Int. Cl.
| | |
|---|---|
| *G06Q 30/0251* | (2023.01) |
| *G06Q 30/0241* | (2023.01) |
| *G06Q 30/0601* | (2023.01) |
| *G06Q 50/00* | (2024.01) |
| *H04N 21/2543* | (2011.01) |
| *H04N 21/258* | (2011.01) |
| *H04N 21/4782* | (2011.01) |

(52) U.S. Cl.
CPC ..... *G06Q 30/0269* (2013.01); *G06Q 30/0277* (2013.01); *G06Q 30/0613* (2013.01); *G06Q 50/01* (2013.01); *H04N 21/25435* (2013.01); *H04N 21/25891* (2013.01); *H04N 21/4782* (2013.01)

(58) Field of Classification Search
CPC combination set(s) only.
See application file for complete search history.

(56) References Cited

U.S. PATENT DOCUMENTS

| | | | |
|---|---|---|---|
| 6,898,571 B1 | 5/2005 | Val et al. | |
| 8,554,629 B2 | 10/2013 | Barton et al. | |
| 8,904,506 B1 | 12/2014 | Canavor et al. | |
| 8,930,204 B1* | 1/2015 | Igoe | G06F 16/335 |
| | | | 705/2 |
| 9,953,358 B1* | 4/2018 | Robertson | G06Q 30/0631 |
| 10,546,326 B2* | 1/2020 | Publicover | H04N 21/6582 |
| 10,554,657 B1* | 2/2020 | Siddiqui | H04L 63/0861 |
| 10,810,357 B1* | 10/2020 | Tsypliaev | G06F 3/0484 |
| 10,832,290 B1* | 11/2020 | Chennavasin | G06Q 30/0269 |
| 2001/0039515 A1 | 11/2001 | Mayadas | |

(Continued)

*Primary Examiner* — Marie P Brady
(74) *Attorney, Agent, or Firm* — HUNTON ANDREWS KURTH LLP

(57) ABSTRACT

A social media platform can display a content item specifically targeted to a user by a targeting algorithm. The content item can display a graphic icon next to the content item. The user can select the graphic icon and provide input to the social media platform. For example, the user can log in a third-party platform, which can transmit certain data to the social media platform. Using the transmitted data, a de-targeting algorithm can block the content item. The de-targeting algorithm can also block unwanted content items in the future.

16 Claims, 6 Drawing Sheets

(56) References Cited

U.S. PATENT DOCUMENTS

| | | | |
|---|---|---|---|
| 2002/0002597 A1 | 1/2002 | Morrell, Jr. | |
| 2002/0026352 A1 | 2/2002 | Murata | |
| 2002/0120507 A1 | 8/2002 | Chanos et al. | |
| 2007/0260516 A1 | 11/2007 | Schoen et al. | |
| 2008/0032678 A1 | 2/2008 | Suresh | |
| 2008/0052153 A1 | 2/2008 | Cook | |
| 2008/0091535 A1 | 4/2008 | Heiser, II et al. | |
| 2009/0083139 A1 | 3/2009 | Pavlov | |
| 2009/0125934 A1* | 5/2009 | Jones | H04N 21/466 725/28 |
| 2009/0163183 A1* | 6/2009 | O'Donoghue | H04M 7/0024 455/414.1 |
| 2009/0192888 A1* | 7/2009 | Barton | G06Q 30/02 705/14.34 |
| 2009/0260064 A1* | 10/2009 | McDowell | H04L 63/0876 726/4 |
| 2009/0287515 A1 | 11/2009 | Mehta et al. | |
| 2011/0276383 A1 | 11/2011 | Heiser, II et al. | |
| 2012/0054002 A1 | 3/2012 | Rotbard et al. | |
| 2012/0059716 A1 | 3/2012 | Agarwal et al. | |
| 2012/0101877 A1 | 4/2012 | LeVine | |
| 2012/0284100 A1 | 11/2012 | Goldberg | |
| 2013/0036009 A1 | 2/2013 | Heiser, II et al. | |
| 2013/0066695 A1 | 3/2013 | Just | |
| 2014/0006150 A1* | 1/2014 | Thompson | G06Q 30/0251 705/14.53 |
| 2014/0129292 A1* | 5/2014 | Ruvini | G06Q 30/0631 705/7.29 |
| 2014/0172585 A1 | 6/2014 | Faccer | |
| 2014/0207549 A1 | 7/2014 | LeVine | |
| 2014/0278941 A1* | 9/2014 | Livingston | G06Q 30/0245 705/14.45 |
| 2014/0279040 A1 | 9/2014 | Kuboyama | |
| 2014/0351050 A1* | 11/2014 | DeLuca | G06Q 30/0257 705/14.55 |
| 2015/0039446 A1 | 2/2015 | Wang et al. | |
| 2016/0019657 A1 | 1/2016 | Mande | |
| 2016/0042385 A1 | 2/2016 | Blackhurst et al. | |
| 2016/0300231 A1* | 10/2016 | Shavell | G06Q 20/425 |
| 2017/0032404 A1* | 2/2017 | Sembrat | G06Q 30/0239 |
| 2017/0195702 A1* | 7/2017 | Das | H04N 21/25435 |
| 2017/0236147 A1 | 8/2017 | Chura | |
| 2018/0032997 A1 | 2/2018 | Gordon et al. | |
| 2018/0053218 A1 | 2/2018 | Singh et al. | |
| 2018/0060944 A1 | 3/2018 | Chefalas et al. | |
| 2018/0181996 A1* | 6/2018 | Matthews | G06Q 30/0269 |
| 2019/0303978 A1* | 10/2019 | Zacharatos | G06Q 50/01 |
| 2020/0304863 A1* | 9/2020 | Domm | H04L 67/55 |
| 2022/0138800 A1* | 5/2022 | Knowles | H04W 4/027 705/14.58 |

\* cited by examiner

CONTENT OPTIMIZATION ON A SOCIAL MEDIA PLATFORM BASED ON THIRD-PARTY DATA

CROSS REFERENCE TO RELATED APPLICATION

This application is a continuation of U.S. patent application Ser. No. 16/734,581 filed Jan. 6, 2020, the complete disclosure of which is incorporated herein by reference in its entirety.

BACKGROUND

Many social media platforms or even traditional websites use targeting techniques to provide content to their users. As such, the content displayed to one group of users can be different from the content displayed to another group of users. For example, a platform might decide what type of content to direct to its users based on the users' traits. These traits can be demographic which can focus on race, economic status, sex, age, education, income and employment. These traits can also be psychographic focused which are based on the users' values, personality, attitudes, opinions, lifestyles and interests. The traits can also be behavioral variables, such as browser history, purchase history, and other recent activity. Targeted content promotion is focused on certain traits of the receiver and the users who are likely to have a strong preference for the content will receive the content instead of those who have no interest. This minimizes wasteful content distribution, i.e., no content will be distributed to a user who has no interest in receiving the content. Similarly, targeted content promotion minimizes unnecessary application processing and rendering of irrelevant content in a user interface.

SUMMARY

Many social media platforms and websites display content to their users based on the users' preferences and needs. For example, on a social media platform, each user can be associated with a profile, and a content targeting algorithm can select content to be displayed to the user based on the user's profile. In some platforms, the profile can be very detailed and comprehensive. Targeted content delivery based on a comprehensive user profile can be very effective in promoting the most relevant content to the user because the targeting algorithm can accurately predict the user's interests and needs. However, no matter how frequently a profile is updated, there are times when a profile is outdated or simply does not have enough information to warrant an accurate prediction about the user. In such instances, content delivery based on the user's profile can generate inaccurate and ineffective results.

In particular, one of the problems associated with targeted content delivery on social media platforms (and other mediums such as websites) is that the targeting algorithms for these platforms utilize the users' browsing or search history to recommend content to the users. For example, if a user searches for a conservative news outlet, the social media platform will continuously suggest content from conservative sources to the user. As another example, if a user searches for golf equipment, the social media platform will learn this fact and continuously advertise golf equipment to the user. As yet another example, if a user visits an online pet store website, the social media platform can recognize this visit and may begin to show the user pet store advertisements, even for the specific items the user viewed. The idea is that the user's search or browsing history is probably the most relevant and accurate indicator of the user's current needs and interests. Therefore, in order to optimize content selection and delivery, the targeting algorithm should take into account a user's browsing or search history when recommending content to the user.

However, there are certain instances in which a user's search or browsing history is not a good indicator of a user's needs or interests. For example, some users tend to search for a product online before purchasing the product from an online retailer or in-person. While the user is searching for the product, the user might be interested in receiving suggested articles and reviews about the product. However, after the user purchases the product, the user is not interested in receiving any content about the product because the user has already made the decision to purchase the product. In situations like this, the user's search history might not indicate that the user actually purchased the product, and hence, the user could continuously receive content relating to a product that the user has already purchased. Obviously, this kind of content targeting is ineffective and can irritate the user.

Certain platforms allow users to provide feedback for the targeted content displayed to the user. For example, certain platforms allow users to block a particular type of content when the user is not interested in the content or the content is inappropriate for the user. However, these systems are not very effective because users do not accurately or honestly express their preference (if they express them at all). This is because many social media or similar platforms are free content delivery services, and thus, the users find targeted content, e.g., advertisement, to be unwanted or undesirable. On these platforms, a user often desires not to see any advertisement, and as such, if the user is asked to provide feedback about a particular advertisement, the user might request the platform to block the advertisement. This might not be because of the content of the particular advertisement, but rather because the user wants to block all targeted advertisement. Hence, a part of the problem stems from the fact that user input might not be accurate or complete. Additionally, many users simply ignore the targeted content and decide to not provide any feedback at all, which in turn reduces the effectiveness of the platform overall.

As such, it is an object of this disclosure to provide a system and method for refining how content is targeted in social media or other platforms. The system of the present disclosure provides for a de-targeting algorithm which can receive updates from a user or third-party sources to further refine selections made by the targeting algorithm. The third-party information can verify the user input, and thus, it can enhance the accuracy and reliability of the content selection.

In one example embodiment, a social media platform can display a content item specifically targeted to a user by a targeting algorithm. The content item can display a graphic icon next to the content item. The user can select the graphic icon and provide input to the social media platform. For example, the user can log in a third-party platform, which can transmit certain data to the social media platform. Using the transmitted data, a de-targeting algorithm can block the content item. The de-targeting algorithm can also block unwanted content items in the future.

DETAILED DESCRIPTION

Social Media Platform

Figure 1:
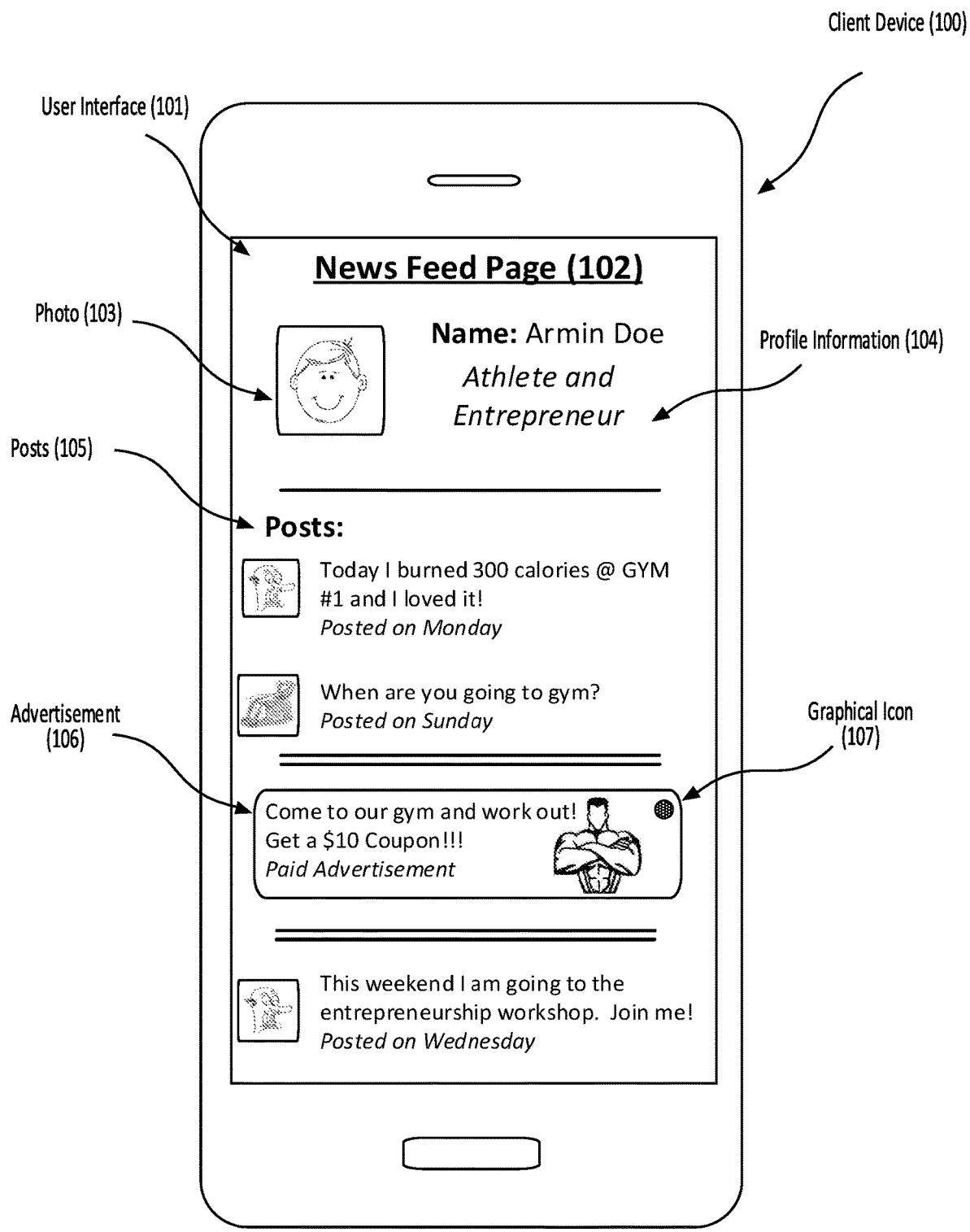
FIG. 1 shows a news feed page of a social media platform displaying targeted content according to an example embodiment.

In an example embodiment, a social media platform can display content to the users of the platform. The social media platform can include a targeting algorithm which can customize the content based on each user's profile. An application of a client device can display and facilitate a user's interactions with the social media platform. For example, the application can display user profile pages, group profile pages, user posts and replies (or comments). As another example, the application can give the user the ability to draft a post and post it on the social media platform. As yet another example, the application can display the social media platform's news feed page.

In an example embodiment, the social media platform can include a news feed page, and the application is configured to display the news feed page. The news feed page can be an aggregation of social media posts and comments that have been posted by various users. The news feed page can also include other types of content, e.g., advertisement. For example, a news feed page can display the social media posts that have been generated over a period of time, e.g., 1 day, by the users or a subset of the users of the social media platform. The users or the subset of the users of the social media platform can be linked to the first user (e.g., friends or followers).

In some embodiments, the news feed page is configured to display targeted content, e.g., the news feed page can display posts and comments based on the user's profile information. In other embodiments, the news feed page is configured to display the posts of users who are not necessarily linked or related to the first user. For example, if the user's profile indicates a certain characteristic for the user, e.g., the user is interested in yoga and participates in yoga classes, the news feed page can display content related to this characteristic or attribute, e.g., posts from yoga instructors, posts related to yoga groups, or advertisements related to yoga.

In an example embodiment, the news feed page can display to the user posts by other users who are similar to the user in some respect, e.g., have similar profile information. For example, for a user who is interested in running, the news feed page of the user can display posts of other users who are interested in running. As another example, for a user who is interested in running, the news feed page of the user can display an advertisement related to running.

In an example embodiment, the news feed page of a user of the social media platform can display advertisement. The social media platform can use the targeting algorithm to determine what advertisement content is appropriate or desirable for the user. For example, the targeting algorithm can use information stored in a user's profile to determine the advertisement content most relevant to the user. In this example, the social media platform can prioritize advertising alcoholic beverages, e.g., beers, to male users under 35, but the social media platform can prioritize advertising accessories, e.g., handbags, to female users under 35.

In an example embodiment, the social media platform can include a de-targeting algorithm. The de-targeting algorithm can eliminate, block or exclude certain content targeted at the user. For example, based on a user's profile and recent browser traffic to a shopping site, a targeting algorithm can determine that the user might be interested in purchasing a bicycle. However, a de-targeting algorithm might have information that the user has recently purchased a bicycle on another website, thereby indicating that the user's interest in purchasing a bicycle is greatly diminished (because the user likely doesn't need two of the same bicycles). Hence, if the targeting algorithm recommends a bicycle advertisement to a user based on the user's profile and recent browsing history, the de-targeting algorithm would block the advertisement because it is not relevant to the user.

In one example embodiment, the social media platform can display a graphic icon for providing information to a de-targeting algorithm. For example, the social media platform can display the graphic icon next to each content item to enable the user to provide information to the de-targeting algorithm. By interacting with the graphic icon, the user can indicate whether a particular content item, e.g., advertisement, is relevant or irrelevant to the user.

In one example embodiment, the graphic icon can enable the user to sign into a third-party platform so that the third-party platform can provide data to the social media platform. Using the third-party data, the social media platform can ensure that a preference selected by the user is accurate and reliable. For example, a graphic icon can be displayed next to an advertisement banner. By selecting the graphic icon, the user can select that the user is not interested in the advertisement, e.g., because the user has already purchased the product. Subsequently, the social media application can prompt the user to log into a third-party platform, e.g., data provider platform, to verify the user's selection. The data provider can store purchase data for the user. Once the user logs into the data provider platform, the data provider can provide the purchase data to the social media platform. For example, the data provider can provide transaction data indicating that the user has purchased the advertised product. Using the transaction data, the social media platform can ensure that the user's selection is accurate and reliable, and thus, the social media platform can provide this data to its de-targeting algorithm to block this kind of advertisement in future.

In one example embodiment, after a user logs in the data provider platform from the social media platform, the social media platform will continue to access the data provider platform to receive data for the de-targeting algorithm. The de-targeting algorithm can use the data to block future content.

FIG. 1 shows a news feed page 102 of a social media platform displaying targeted content according to an example embodiment. In this example embodiment, the client device 100 can display a user interface 101 which can show the news feed page 102. The news feed page 102 can be a part of a social media application for displaying the social media platform and facilitating a user's interaction with the platform. The news feed page 102 can display a photo 103 of the user. The news feed page 102 can also display profile information 104, which can include the user's name and hobbies.

In some embodiments, the profile can include additional information, but not all the information needs to be displayed on the news feed page 102. For example, the profile can include various information about the user, e.g., date of birth, address, biometric information, information about the user's physique, a fingerprint of the user, etc. In some embodiments, the user can upload information into the profile, e.g., machine generated information can be uploaded into the profile. For example, the user can upload fitness data gathered by a tracker into the user profile. As another example, the user can upload tracking data gathered by a cellphone into the user profile. The information included in the user profile is not limited to information provided by the user. In an example embodiment, the social media platform can also add information to the profile. This information can be an interaction history of a user with the social media platform, an analysis of the user's behavioral characteristics as determined by the interaction history, a regression analysis and other analysis pertaining to the user's traits and habits. In one example embodiment, the user can provide data including the user's behavioral characteristics, a regression analysis and other analysis pertaining to the user's traits and habits. The user can manually provide the data or the user can use a machine to upload the data, e.g., a fitness tracker.

The news feed page 102 can display a plurality of posts by users of the social media platform. The targeting algorithm of the social media platform can choose which ones of the posts of the social media platform to display for each user of the platform. For example, based on the profile information 104 (and friends and followers that the user has amassed on the social media platform), the targeting algorithm can decide which posts to display on the news feed page 102. The news feed page 102 can also display an advertisement 106. The targeting algorithm can choose the advertisement 106 based on the user's profile information 104. For example, based on the age and hobbies of the user specified in the user's profile, the targeting algorithm can determine that an advertisement about a gym would be relevant to the user.

Figure 2:
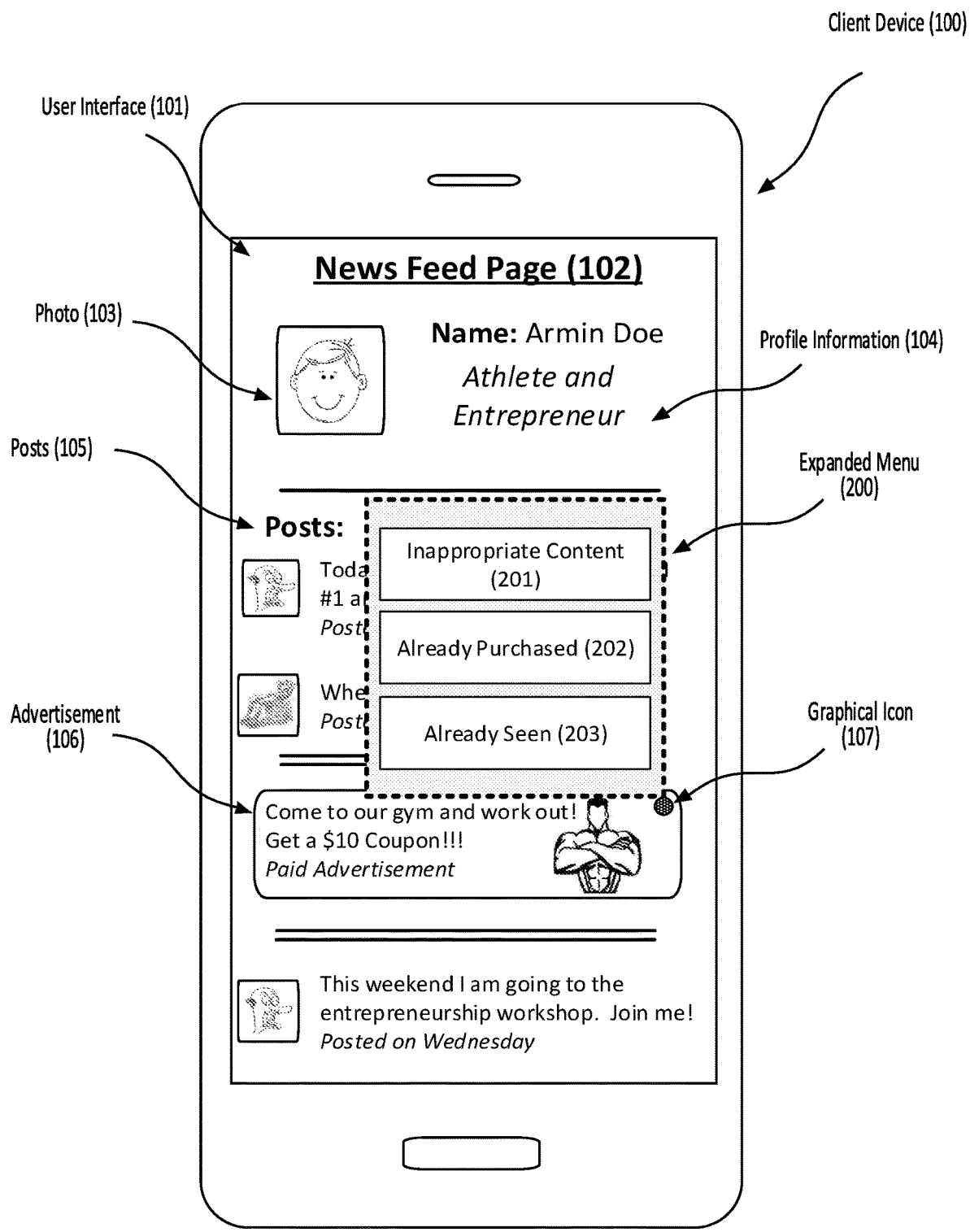
FIG. 2 shows an expanded menu for a content item in the news feed page according to an example embodiment.

The advertisement 106 can include a graphical icon 107 which can enable the user to provide feedback to a de-targeting algorithm of the social media platform. FIG. 2 shows an expanded menu 200 for the advertisement 106 in the news feed page 102 according to an example embodiment. In this example embodiment, the user of the client device 100 can touch the graphical icon 107, and in response, the user interface 101 can display the expanded menu 200. By selecting each of the options of the expanded menu 200, the user can provide information to the de-targeting algorithm. For example, the user can select the option inappropriate content 201 to indicate that the user finds the content to be inappropriate; the user can select the option already purchased 202 to indicate that the user has already purchased the advertised item; the user can select the option already seen 203 to indicate that the content has already been displayed to the user and that the user is not interested in the content anymore.

Figure 3:
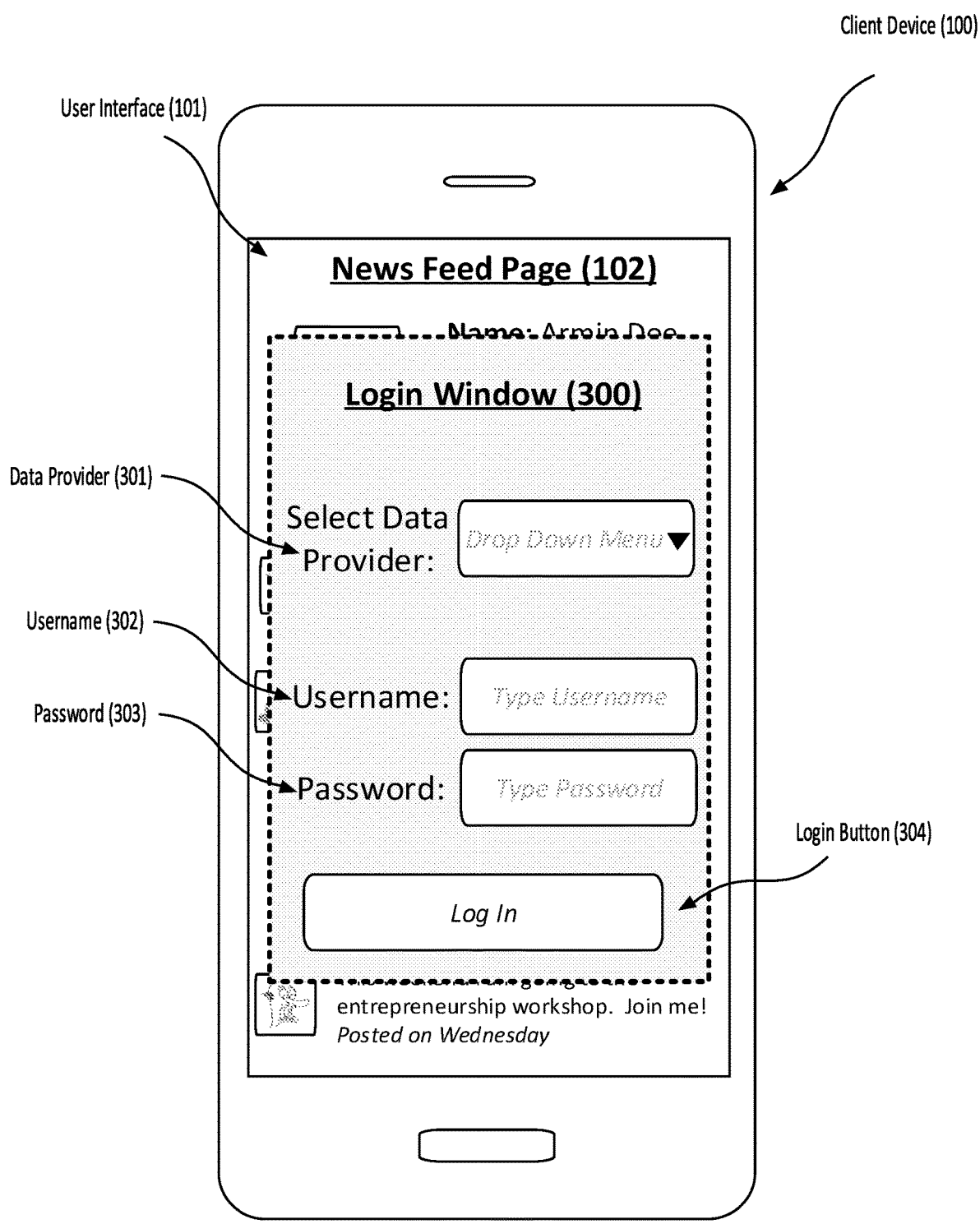
FIG. 3 shows an exemplary login window displayed in response to selection of an option on the expanded menu of the graphical icon.

FIG. 3 shows an exemplary login window 300 displayed in response to selection of an option on the expanded menu 200 of the graphical icon 107. In this example embodiment, the user can select one of the options, e.g., already purchased 202, on the expanded menu 200. In response to selecting this option, the user interface 101 can display a login window 300, which enables the user to provide access to a data provider. For example, the login window 300 can include a field for selecting a data provider 301, a field for entering a username 302 and a field for entering a password 303. The user can select a credit card company as the data provider and the user can enter the user's username and password in the fields 302 and 303.

Once the user logs in the credit card company's website using the login window 300, the credit card company can provide the social media platform with transaction data. For example, the credit card company can provide transaction data for a gym membership to the social media platform. Using the transaction data, the social media platform can verify that the user pays for a gym membership. This confirms the user's earlier selection, i.e., already purchased option 202. The social media platform can provide this data to the de-targeting algorithm to block future advertisements including the same or similar content.

In one example embodiment, the user can specify preferences regarding the user's selection on the extended menu 200. The user can specify the user's preference in the login window 300, the extended menu 200 or another window. For example, if the user selects the already purchased option 202, in one embodiment, prior to the login window 300 is displayed, the user interface 101 can display another window which asks the user how long the user desires not to see the specific content displayed (e.g., advertisement 106). The social media platform can take the user's input and provide it to the de-targeting algorithm.

Figure 4:
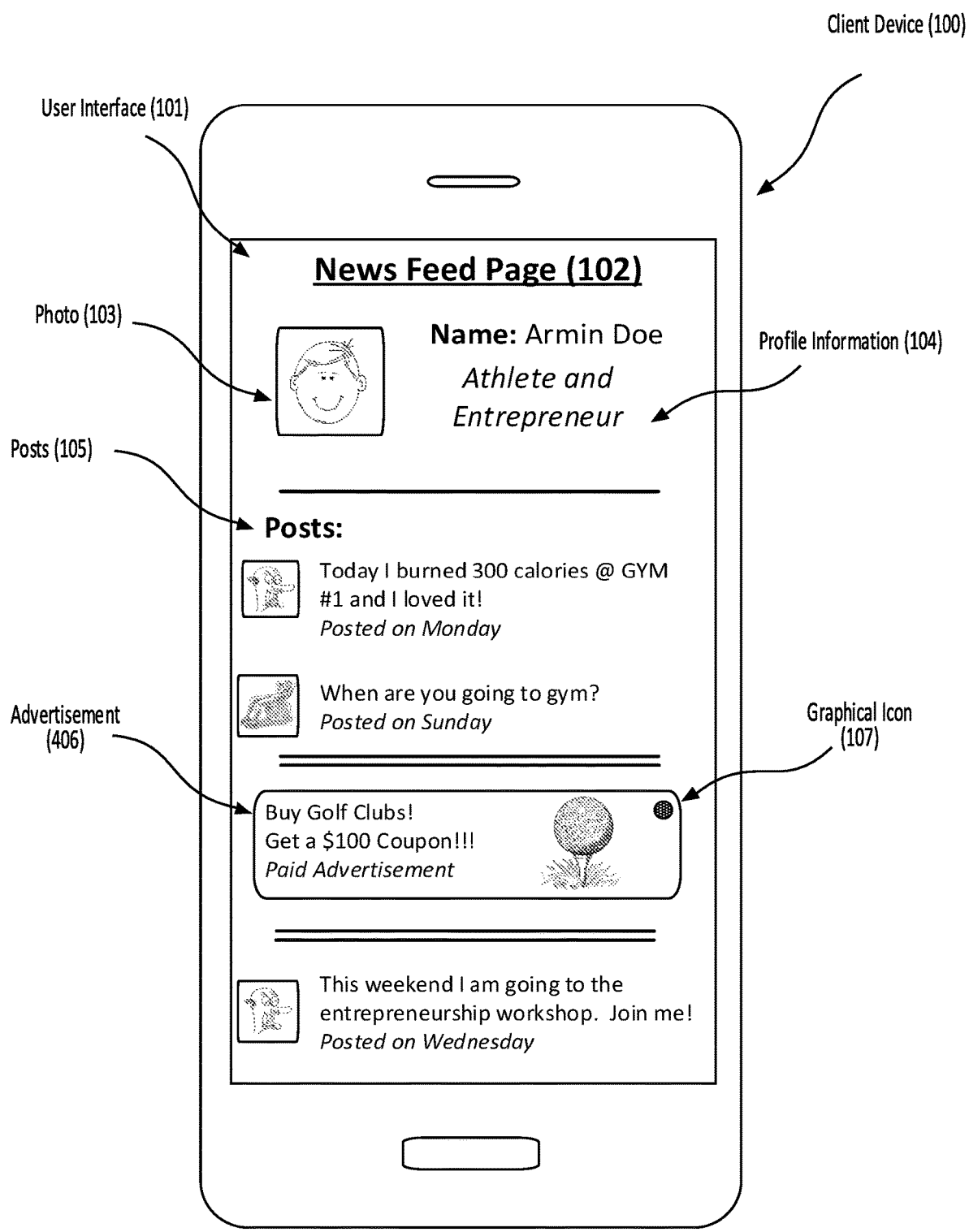
FIG. 4 shows the news feed page after a user verifies the user's selection by logging in a data provider platform.

FIG. 4 shows the news feed page 102 after a user verifies the user's selection by logging in a data provider platform. In this example embodiment, the targeting algorithm selects an advertisement 406, which relates to golf. It is noted that the de-targeting algorithm blocked the original advertisement 106 about becoming a gym member after the de-targeting algorithm received data indicating that the user pays for a gym membership.

De-Targeting Algorithm

In one example embodiment, the de-targeting algorithm can receive data from a third-party platform and block content on the social media platform. In particular, the de-targeting algorithm can detect an association between a content item and the data received from the third-party platform for a particular user or a group of users. For example, the content item can be an advertisement about a gym membership and the third-party platform can provide transaction data relating to a gym membership. In this example, the de-targeting algorithm can use a natural language processing ("NLP") module to determine an association between the content item and the third-party data. For example, the NLP module can determine that the advertisement about a gym membership is related to the payment for the gym membership.

The NLP module can use intent classification techniques. Intent classification can be a natural language understanding ("NLU") task that can understand at a high level what the user's intent is in written text, and thus, what message the user is intending to send with the writing. The NLP module can determine the intent using hard-coded rules with regular expression (i.e., scanning the words). The NLP module can also determine the intent by training a supervised machine learning classification model on labeled data. Many machine-learning models can be used for this purpose, e.g., a neural network (or deep learning), a recurrent neural net such as LSTM, decision tree-based methods like random forest or gradient boosted machines, support vector machine, logistic regression, etc. The NLP module can also include some preprocessing modules to convert text into character, word, or sentence embeddings that can be fed into the model. Basic preprocessing can include stemming or lemmatization, sentence or word tokenization, stopword removal, etc. This can include a term frequency based approach, including TF-IDF, or Word2Vec, Universal Sentence Encoder, etc. Part of the NLU can also include dependency parsing to try to capture negation, or sentiment analysis.

In one example embodiment, the de-targeting algorithm can block a social media post for a user of the social media platform. For example, based on the profile of the user and the friends that the user interacts with on the platform, the targeting algorithm can recommend a set of posts to the user, e.g., posts regarding boycotting an election (because the friends of the user with similar profiles have been reading and commenting on these posts). However, on the website for a retailer of electronic books, the user has been actively purchasing books touting the benefits of participation in elections in liberal democracies. The user can provide this data to the social media platform through the login mechanism discussed in FIG. 3. The de-targeting algorithm can use this data to block posts encouraging boycotting elections.

The Third-Party Data

In one example embodiment, the third-party data can include item-level transaction data. Item-level transaction data can include a list of the items purchased by a user, a price for each respective item and a purchase date. If a user has recently purchased an item, probably the user is not interested in seeing any content or advertisement about the item. Using item-level transaction data, the de-targeting algorithm can enhance the efficacy of content delivery because the de-targeting algorithm can determine if the user has recently purchased an advertised item. For example, if an advertisement is for a golf club, the de-targeting algorithm can review a transaction dataset associated with a user and determine that the user has purchased golf clubs over the past months. As such, the de-targeting algorithm can block advertisements relating to golf clubs.

In one example embodiment, item-level transaction data can be obtained from a variety of sources. For example, merchants can provide item level data to a credit card company, which can provide the data to the social media platform. As another example, a credit card company can access a user's mailbox and scan the emails in the user's mailbox. In particular, the credit card company can scan the mailbox for purchase receipts to determine item-level transaction data.

In one example embodiment, the third-party data can include transaction data, which can specify a total amount for a purchase transaction as well as a date and a merchant code for the transaction. Transaction data might not provide item-level data to a de-targeting algorithm. However, a machine learning technique can be used, e.g., by the credit card company, to predict item-level transaction data.

Machine learning uses statistical techniques for teaching computers with data to perform specific tasks without being explicitly programmed to do so. The goal of machine learning is to construct algorithms that can learn from and make predictions on data. These algorithms work by creating mathematical models which can classify data. The process of creating the models can involve training and fine-tuning the model parameters using input data.

In one example embodiment, prior item-level transaction data can be used to train a machine learning model. For example, the training dataset can include labeled data, which can include transaction data (e.g., total payment, merchant code, date, etc.) as well as item-level transaction data (e.g., a list of the items purchased by a user and a price for each respective item). Using this training dataset, the machine learning model can make predictions about possible items included in a purchase transaction. The credit card company can provide the predicted items to the social media platform which can use the data to de-target certain advertisements.

In one example embodiment, in addition to transaction data, the third-party platform can provide metadata to the social media platform. For example, the metadata can include information which can be added to the user's profile on the social media platform to make more accurate predictions about the interests and needs of the user.

Website Applications

In one example embodiment, a website can display content items based on a user's profile. For example, the website can display banner advertisements to visitors. The banner advertisements can be selected by a targeting algorithm, which can recognize the visitors using the visitors' IP address (or browser extensions). The website can display a graphic icon next to the banner advertisement. A visitor of the website can select the graphic icon, and in response, the user can provide input to the website concerning whether the banner advertisement is relevant to the user. In case the user indicates that the content is irrelevant to the user, the website can ask the user to log in a third-party data provider platform to confirm the user's input. Once the third-party data provider platform confirms the user's input, the website can store the user's input in association with the user's IP address. A de-targeting algorithm of the website can use the user input and third-party data for future advertisements to ensure that the user will not be displayed content that is not relevant to the user.

Example Embodiment

Figure 5:
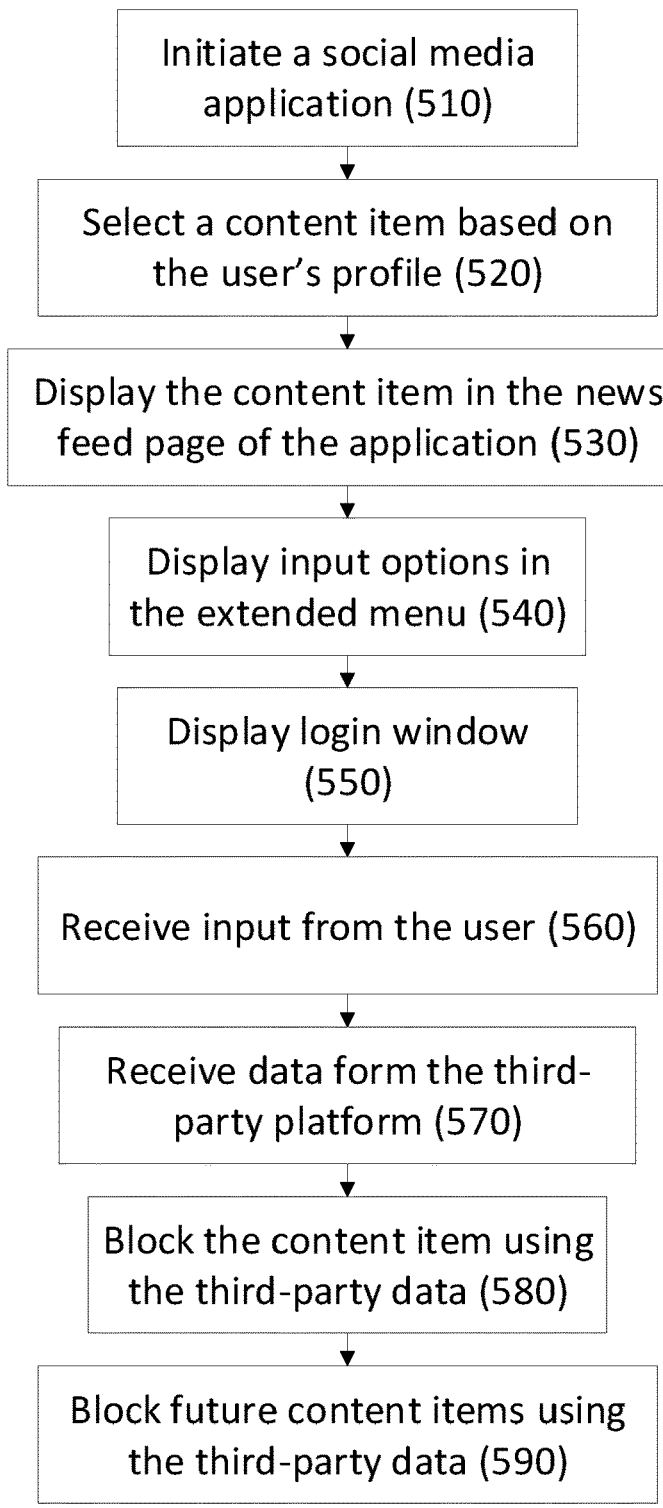
FIG. 5 shows a flow chart of a method for de-targeting content on a social media platform.

FIG. 5 shows a flow chart of a method for de-targeting content on a social media platform. In this example embodiment, in step 510, a user can open up an application of a social media platform. In step 520, the social media platform can evaluate the user's profile and select an advertisement to be displayed to the user in the application based on the information provided in the user's profile. For example, for a user whose profile indicates that the user is interested in political news, the targeting algorithm of the social media platform can recommend donating to a political action committee for conservative causes. In step 530, the application can display a news feed page, which can include a banner advertisement selected by the targeting algorithm. The advertisement can include a graphic icon for a user to provide input to the social media platform.

In step 540, the user can tap on the graphic icon, and in response, the application can display an extended menu including a few options for providing input to the social media platform. For example, one of the options can be that the displayed advertisement is not relevant to my views. The user can select this option. In response to selection of the option by the user, in step 550, the application can display a login window for the user to log into a third-party data provider platform. In step 560, the user can select a third-party data provider, e.g., an ebook account for the user, and type the user's username and password on the login window.

Subsequently, in step 570, the ebook platform can transmit a list of books studied by the user to the de-targeting algorithm of the social media platform. For example, the de-targeting algorithm can use an NLP module to determine that the list of books provided to the social media platform relate to liberal causes. In step 580, the de-targeting algorithm can block the advertisement (which relates to conservative causes). In step 590, the de-targeting algorithm can block future advertisements relating to the same or similar advertisement.

Technical Implementation of the Server

Figure 6:
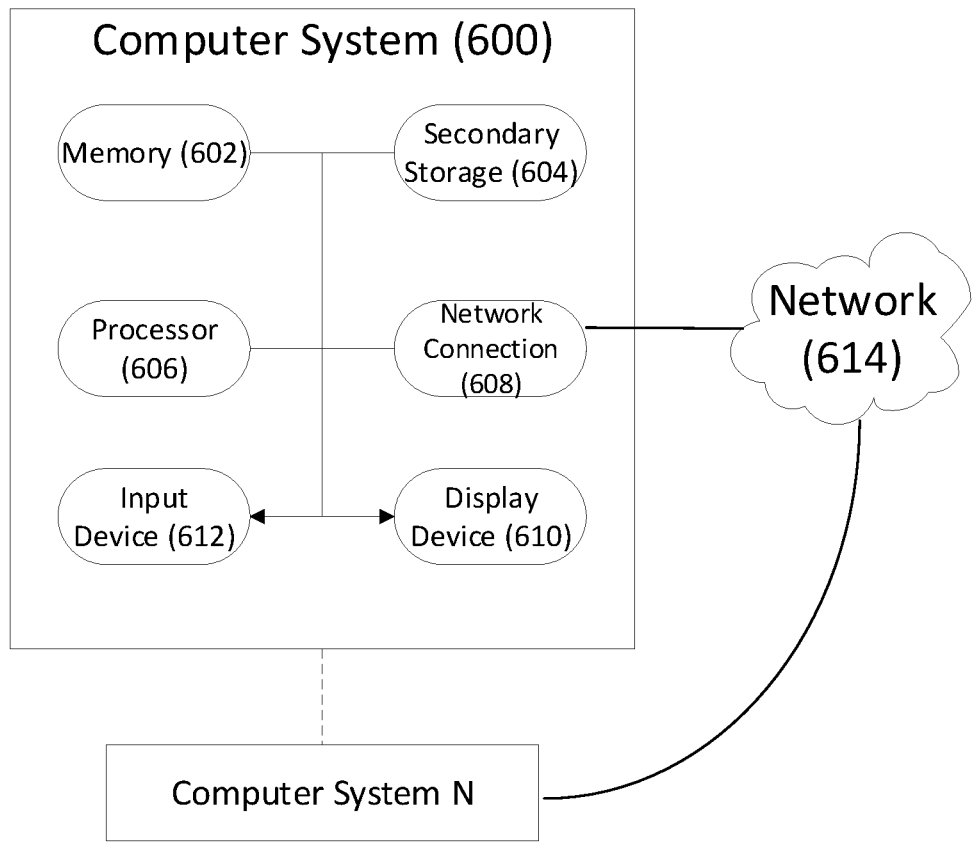
FIG. 6 illustrates exemplary hardware components for a server.

FIG. 6 illustrates exemplary hardware components of a server. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquiries, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A system for presenting content via a social media platform, the system comprising:
 a communication interface that enables communication, via a network, with a first third-party system, and a client device;
 a memory that stores:
  the content including a plurality of content items;
  a user profile including a user identifier and fitness data associated with the user identifier;
  a targeting algorithm configured to select a subset of the plurality of content items; and
  a de-targeting algorithm configured to exclude an excluded content item in the subset of the plurality of content items; and a processor configured to:
receive, via the network using the communication interface, the fitness data uploaded using a fitness tracker;
transmit, via the network using the communication interface to the first third-party system, a request for information, wherein the request identifies the user identifier;
receive, via the network using the communication interface, a response from the third-party system that includes transaction data associated with the user identifier;
execute the targeting algorithm to derive a first outcome using the user profile including the fitness data, and execute the de-targeting algorithm to derive a second outcome using the transaction data and a predetermined period of time during which a particular content item should be excluded;
select the subset of the plurality of content items based on the first outcome from the targeting algorithm and exclude the particular content item from the subset of the plurality of content items based on the second outcome from the de-targeting algorithm and a natural language processing analysis of an association between the transaction data and the subset of the plurality of content items;
transmit a communication to the client device, wherein the communication is configured to cause the client device to:
display at least one of the subset of the plurality of content items and a graphical icon in a social media application;
display, in response to a selection of the graphical icon, an extended menu including a feedback field for receiving a feedback relating to the at least one of the subset of the plurality of content items; and
display, in response to receiving the feedback, a first field for receiving a username and a second field for receiving a password;
receive the username, the password, and the feedback from the client device;
transmit the username and the password to the third-party system, which is a transaction data provider;
receive additional transaction data from the third-party system;
execute the targeting algorithm to derive a third outcome using the user profile and execute the de-targeting algorithm to derive a fourth outcome using the additional transaction data, the feedback, and the predetermined period of time;
select a second subset of the plurality of content items based on the third outcome from the targeting algorithm and exclude a second excluded content item from the second subset of the plurality of content items based on the fourth outcome from the de-targeting algorithm; and
transmit the second subset of the plurality of content items to the client device through the communication interface.

2. The system of claim 1, wherein the content includes a social media post.

3. The system of claim 1, wherein the at least one of the subset of the plurality of content items is an advertisement.

4. The system of claim 1, wherein the user profile includes an age, an address, and biometric information.

5. The system of claim 1, wherein the user profile includes web-browsing history.

6. The system of claim 1, wherein the at least one of the subset of the plurality of content items is a social media post.

7. The system of claim 1, wherein the client device is a mobile device.

8. The system of claim 1, wherein the transaction data includes a transaction relating to the at least one of the subset of the plurality of content items.

9. A method for presenting content via a social media platform, the method comprising:
storing, in a database of a server, the content including a plurality of content items, a user profile including a user identifier and fitness data associated with the user identifier, a targeting algorithm configured to select a subset of the plurality of content items, and a de-targeting algorithm configured to exclude an excluded content item in the subset of the plurality of content items;
receive, via a network using a communication interface, the fitness data uploaded using a fitness tracker;
transmitting, via the network using the communication interface to a third-party system, a request for information, wherein the request identifies the user identifier;
receiving, via the network using the communication interface, a response from the third-party system that includes transaction data associated with the user identifier;
executing, using a processor of the server, the targeting algorithm to derive a first outcome using the user profile including the fitness data, and executing the de-targeting algorithm to derive a second outcome using the transaction data and a predetermined period of time during which a particular content item should be excluded;
selecting, using the processor, the subset of the plurality of content items based on the first outcome from the targeting algorithm and excluding the particular content item from the subset of the plurality of content items based on the second outcome from the de-targeting algorithm and a natural language processing analysis of an association between the transaction data and the subset of the plurality of content items;
transmitting a communication to a client device, wherein the communication is configured to cause the client device to:
display at least one of the subset of the plurality of content items and a graphical icon in a social media application;
display, in response to a selection of the graphical icon, an extended menu including a feedback field for receiving a feedback relating to the at least one of the subset of the plurality of content items; and
display, in response to receiving the feedback, a first field for receiving a username and a second field for receiving a password;
receiving the username, the password, and the feedback from the client device;
transmitting the username and the password to the third-party system, which is a transaction data provider;
receiving additional transaction data from the third-party system;
executing the targeting algorithm to derive a third outcome using the user profile and execute the de-targeting algorithm to derive a fourth outcome using the additional transaction data, the feedback, and the predetermined period of time;

selecting a second subset of the plurality of content items based on the third outcome from the targeting algorithm and exclude a second excluded content item from the second subset of the plurality of content items based on the fourth outcome from the de-targeting algorithm;

transmitting the second subset of the plurality of content items to the client device through the communication interface.

10. The method of claim 9, wherein the content includes a social media post or an advertisement.

11. The method of claim 9, wherein the at least one of the subset of the plurality of content items is a social media post.

12. The method of claim 9, wherein the client device is a mobile device.

13. The method of claim 9, wherein the user profile includes an age, an address, or biometric information.

14. The method of claim 9, wherein the user profile includes web-browsing history.

15. The method of claim 9, wherein the at least one of the subset of the plurality of content items is an advertisement for a product.

16. The method of claim 9, wherein the email data includes a transaction related to the at least one of the subset of the plurality of content items.

\* \* \* \* \*